United States Patent
Engström et al.

(10) Patent No.: US 7,802,944 B2
(45) Date of Patent: Sep. 28, 2010

(54) TOOL FOR CHIP REMOVING MACHINING AS WELL AS A BASIC BODY AND AN INDEXABLE CUTTING INSERT THEREFOR

(75) Inventors: Tord Engström, Sandviken (SE); Göran Pantzar, Sandviken (SE); Patrik Svedberg, Sandviken (SE); Magnus Åström, Täfteå (SE)

(73) Assignee: Sandvik Intellectual Property AB, Sandviken (SE)

( * ) Notice: Subject to any disclaimer, the term of this patent is extended or adjusted under 35 U.S.C. 154(b) by 235 days.

(21) Appl. No.: 12/149,532

(22) Filed: May 2, 2008

(65) Prior Publication Data
US 2008/0304928 A1 Dec. 11, 2008

(30) Foreign Application Priority Data
Jun. 5, 2007 (SE) .................................... 0701369

(51) Int. Cl.
B23B 27/00 (2006.01)
B23C 5/16 (2006.01)
(52) U.S. Cl. ........................................ 407/66; 407/113
(58) Field of Classification Search ............... 407/11, 407/33, 66, 67, 113–116
See application file for complete search history.

(56) References Cited

U.S. PATENT DOCUMENTS

| | | | |
|---|---|---|---|
| 5,944,456 A | 8/1999 | Shirley et al. | |
| 6,146,061 A | 11/2000 | Larsson | |
| 6,203,251 B1 | 3/2001 | Oppelt et al. | |
| 6,290,436 B1 * | 9/2001 | Qvarth | 407/113 |
| 6,536,996 B2 * | 3/2003 | Satran et al. | 407/34 |
| 6,619,892 B2 | 9/2003 | Enquist | |
| 6,796,750 B2 * | 9/2004 | Men | 407/35 |
| 6,840,716 B2 | 1/2005 | Morgulis et al. | |
| 7,121,771 B2 * | 10/2006 | Englund | 407/103 |
| 7,309,193 B2 * | 12/2007 | Riviere et al. | 407/113 |

(Continued)

FOREIGN PATENT DOCUMENTS

DE 198 48 045 A1 4/2000

(Continued)

*Primary Examiner*—Will Fridie, Jr.
(74) *Attorney, Agent, or Firm*—Drinker Biddle & Reath LLP (57) ABSTRACT

A tool for chip removing machining, including a basic body having a connecting surface included in an insert seat, and an indexable cutting insert mounted in the basic body and having a connecting surface in mechanical engagement with the connecting surface of the basic body, and fixed by a tightening element. The connecting surface of the basic body includes a solitary, polygonal elevation that protrudes from a bottom surrounding the elevation from all sides. The elevation includes two external side support surfaces orientated at an angle to each other. The connecting surface of the cutting insert includes a solitary depression that is wider and deeper than the elevation. The depression is surrounded by a frame in which there are included at least three banks running at an angle to each other and including internal shoulder surfaces, two of which are pressed against the two side support surfaces of the elevation, and lower base surfaces, which are situated in a common plane, three of which rest against the bottom. In addition, the invention relates to a basic body and a cutting insert as such.

11 Claims, 5 Drawing Sheets

U.S. PATENT DOCUMENTS

| | | | |
|---|---|---|---|
| 2002/0037199 A1* | 3/2002 | Satran et al. | 407/54 |
| 2002/0159846 A1* | 10/2002 | Horiike et al. | 407/114 |
| 2003/0017014 A1* | 1/2003 | Morgulis et al. | 407/34 |
| 2003/0072625 A1* | 4/2003 | Morgulis et al. | 407/35 |
| 2006/0056926 A1* | 3/2006 | Riviere et al. | 407/40 |
| 2006/0056928 A1* | 3/2006 | Riviere et al. | 407/113 |
| 2008/0095586 A1* | 4/2008 | Satran et al. | 407/113 |
| 2009/0226267 A1* | 9/2009 | Kovac | 407/102 |

FOREIGN PATENT DOCUMENTS

| | | |
|---|---|---|
| EP | 1 795 288 A1 | 6/2007 |
| JP | 07-299633 | 11/1995 |
| WO | WO 98/30349 | 7/1998 |
| WO | WO 02/055245 A1 | 7/2002 |

* cited by examiner

TOOL FOR CHIP REMOVING MACHINING AS WELL AS A BASIC BODY AND AN INDEXABLE CUTTING INSERT THEREFOR

This application claims priority under 35 U.S.C. §119 to Swedish Patent Application No. 0701369-1, filed on Jun. 5, 2007, which is incorporated by reference herein in its entirety.

FIELD OF THE INVENTION

The present invention relates generally to a tool for chip removing machining of the type that includes a basic body and an indexable cutting insert that is mounted in the basic body with a connecting surface in mechanical engagement with a connecting surface of the basic body included in an insert seat, and fixed by a tightening element. The present invention also relates to a basic body as well as an indexable cutting insert for such tools.

BACKGROUND OF THE INVENTION

Within the art of chip removing or cutting machining of workpieces of metal, there have recently been developed a number of interfaces between the basic body of the tool and the individual cutting insert, more precisely, in the form of varying topographies of the two connecting surfaces engaging mechanically in each other. An object of these modern interfaces is to allow the use of directly pressed, i.e., unground cutting inserts, without minor form defects in the same jeopardizing the machining precision of the tools. Contrary to the older tools, which make use of surface contact between simple, plane bottom and side surfaces in a ground cutting insert as well as a machined insert seat, more modern cutting tools are formed with interfaces in which a plurality of pair-wise co-operating male and female elements are included. Originally, these elements were constituted of a plurality of long narrow parallel and cross-sectionally wedge-shaped ridges and grooves, which together formed so-called serration connecting surfaces. Later, the interfaces have been developed so that certain pairs of ridges/grooves are transverse in relation to others in order to, in such a way, lock the cutting insert in two coordinate directions perpendicular to each other. In addition, interfaces have been produced, the male and female elements of which are no longer elongate, but are in the form of knobs and seatings without any marked length extension.

Common to previously known interfaces, irrespective of whether the male and the female elements are elongate or not, is that the absorption of the cutting forces (axial, radial, and tangential, respectively) is effected by contact between on one hand converging flanks of the male elements and on the other hand diverging flanks of the female elements, the contact between the flanks usually being limited to a line and/or point contact, rather than being a surface contact. Such interfaces may in practice give an acceptable transfer of force in two coordinate directions, but not simultaneously in a third. In, for instance, milling cutters, the axial and radial forces acting on the cutting insert are carried in a satisfying way, while the tangential forces, which aim at pressing in the male and the female elements into each other, are only carried by line or point contact. This involves, among other things, a risk that the cutting insert is dislodged from the exact space position thereof in the basic body of the tool. Generally, the more contact surfaces that should co-operate in an interface, the greater becomes the risk that possible form defects in the cutting insert are added to each other and result in an erroneous, unstable fixation of the cutting insert.

Tools of the kind in question are disclosed in U.S. Pat. Nos. 6,619,892; 5,944,456; 6,146,061; and 6,840,716, for example.

U.S. Pat. No. 6,203,251 discloses a cutting tool in the form of a milling cutter, the basic body of which is formed with an insert seat in which an elevation or head is included, which engages a depression in the underside of the individual cutting insert. However, in this case, there are no internal shoulder surfaces adjacent to the depression pressed against side support surfaces of the elevation. On the contrary, external contact surfaces of the cutting insert are pressed against side support surfaces that are spaced apart from the elevation. This means that possible form defects of the cutting insert will propagate all the way through the same and in such a way impair the machining precision of the tool.

The present invention aims at obviating the above-mentioned shortcomings of previously known cutting tools, and at providing a cutting tool having an improved interface between the basic body and cutting inserts of the tool. Therefore, an object of the invention is to provide a tool having an interface, which includes a minimum number of co-operating contact surfaces, and which, in spite of this, ensures good absorption of the cutting forces in all three coordinate directions.

Another object of the invention is to provide a tool interface, the two co-operating connecting surfaces of which can be manufactured in a simple and reliable way. Thus, the cutting insert, usually composed of cemented carbide, may be produced by conventional compression moulding and sintering without necessarily needing to be precision ground before use. Furthermore, the basic body may be formed with connecting surfaces by simple machining, such as milling and/or drilling.

Yet another object of the invention is to provide a cutting tool, the cutting inserts of which can be mounted in the appurtenant insert seats in the basic body in a smooth way for the operator, even if the cutting inserts are very small.

SUMMARY OF THE INVENTION

In an embodiment, the invention provides a tool for chip removing machining, including a basic body having a connecting surface included in an insert seat, and an indexable cutting insert mounted in the basic body and having a connecting surface in mechanical engagement with the connecting surface of the basic body, and fixed by a tightening element. The connecting surface of the basic body includes a solitary, polygonal elevation that protrudes from a bottom surrounding the elevation from all sides. The elevation includes two external side support surfaces orientated at an angle to each other. The connecting surface of the cutting insert includes a solitary depression that is wider and deeper than the elevation. The depression is surrounded by a frame in which there are included at least three banks running at an angle to each other and including internal shoulder surfaces, two of which are pressed against the two side support surfaces of the elevation, and lower base surfaces, which are situated in a common plane, three of which rest against the bottom.

In another embodiment, the invention provides a basic body for a tool for chip removing machining, including a connecting surface for the co-operation with connecting surfaces in indexable cutting inserts. The connecting surface of the basic body includes a solitary elevation that protrudes from a bottom surrounding the elevation from all sides. The elevation has two external side support surfaces orientated at an angle to each other.

In yet another embodiment, the invention provides an indexable cutting insert for a tool for chip removing machining, including a connecting surface. The connecting surface includes a solitary depression that is surrounded by a frame in which there are included at least three banks running at an angle to each other. The banks include internal shoulder surfaces as well as lower base surfaces situated in a common plane.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
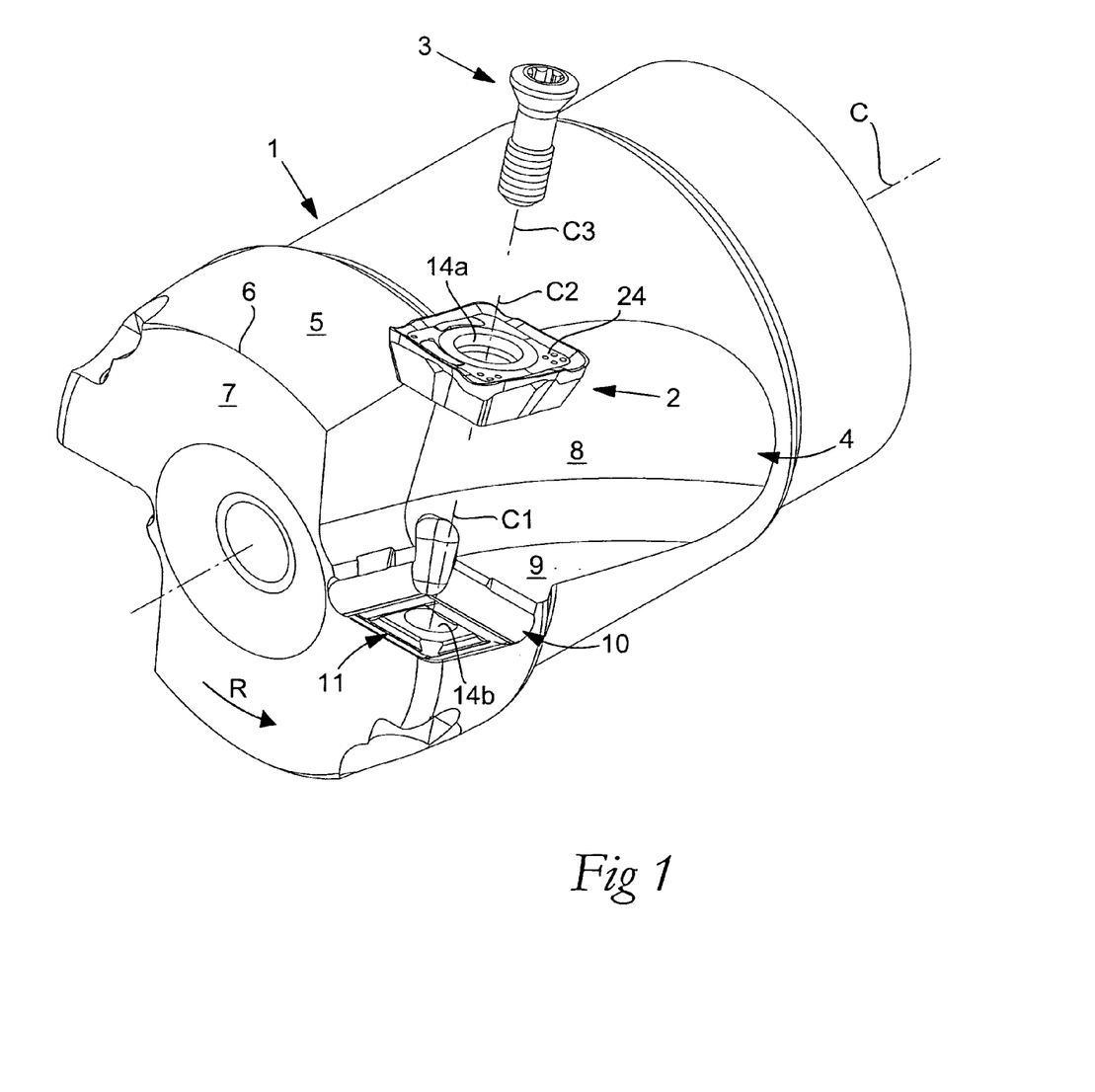
FIG. 1 is an exploded perspective view, showing a cutting tool in the form of a milling cutter made in accordance with an embodiment of the invention, in which a basic body, a number of indexable cutting inserts, as well as tightening elements for the cutting inserts are included.

In FIG. 1, a cutting tool is shown, which includes a basic body 1 and a cutting insert 2 that is fixable in the basic body by a tightening element 3, which in this case is in the form of a screw. In the example, the tool is a milling cutter in the form of an end mill, which includes a plurality of chip pockets 4 in which the same number of cutting inserts can be mounted (only one of which is shown in FIG. 1). The basic body 1 is rotatable in the direction of rotation R around a center axis designated C. Furthermore, the same has a rotationally symmetrical basic shape and includes an envelope surface 5, which via a borderline 6 transforms into a front end surface 7.

The individual chip pocket 4 is delimited by a number of arched part surfaces 8, as well as a plane shoulder surface 9 in relation to which a space or insert seat 10 is countersunk, in which a first connecting surface, generally designated 11, is included.

The tightening screw 3 includes a male thread and a head, which in this case is conical. The screw 3 may be brought through a central through hole 14a in the cutting insert 2, and be tightened into a female thread (not visible) of a hole 14b that mouths in the connecting surface 11. The center axis of the last-mentioned hole is designated C1, while the corresponding center axes of the hole 14a and tightening screw 3 are designated C2 and C3, respectively.

Figure 2:
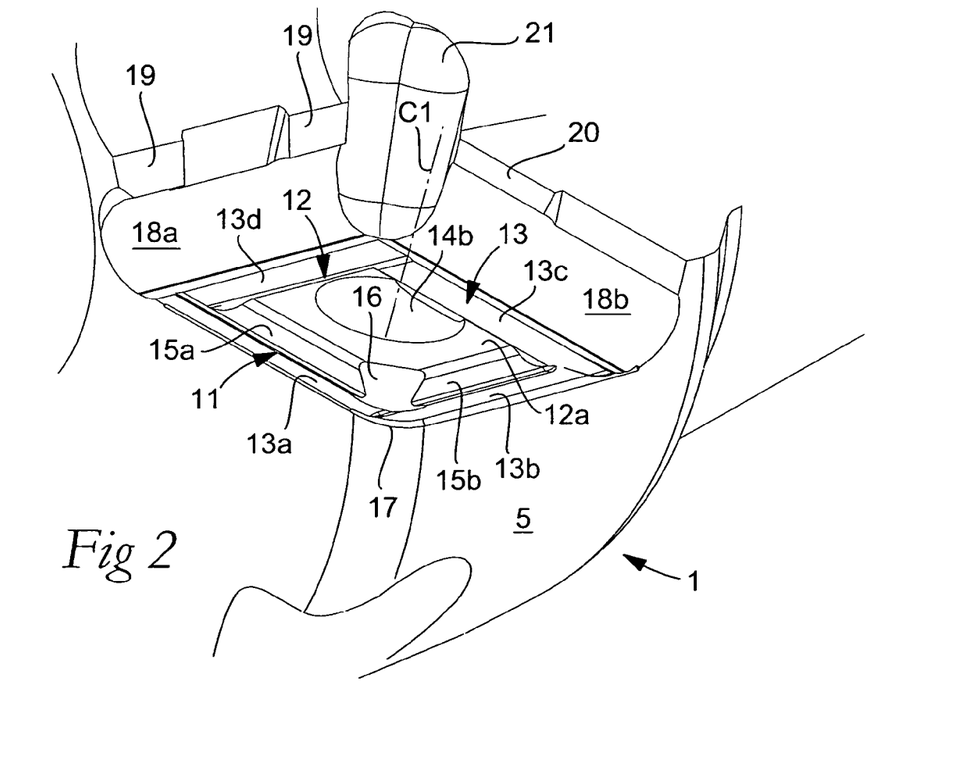
FIG. 2 is an enlarged top perspective view, showing an insert seat included in the basic body of the tool and having a first connecting surface.

Reference is now made to FIG. 2, which shows how the first connecting surface 11 of the basic body 1 includes a single, polygonal elevation or head 12, which protrudes from a bottom 13 surrounding from all sides, which bottom, in this case—when the cutting insert has a square basic shape—includes four long narrow part surfaces 13a, 13b, 13c and 13d. In addition to a plane upperside 12a, the elevation 12 is delimited by four side surfaces, two of which are visible in FIG. 2. In this case, the two visible side surfaces 15a, 15b run at an angle of 90° to each other and meet each other in a corner in the form of a truncated or chamfered corner surface 16. Corner 16 is situated in the immediate vicinity of the corner 17 included in the basic body, which is present where the end surface 7 meets the envelope surface 5 and the bottom 13. As is described in more detail below, the two surfaces 15a, 15b of the elevation 12 form side support surfaces for the cutting insert. In practice, the surfaces 15a, 15b may be plane and form an obtuse angle with the bottom support surfaces 13a, 13b.

Among the four part surfaces, which together form the bottom 13 that surrounds the elevation 12, three part surfaces, viz. surfaces 13a, 13b and 13c, are situated in a common plane, while the fourth part surface 13d is somewhat countersunk in relation to the plane. This means that the surface 13d will clear the cutting insert when the insert is mounted in the insert seat. The part surfaces 13b and 13c may be entirely plane, while the part surface 13a may be slightly cambered, more precisely, in such a way that the surface has a certain rise or highest point, which suitably may be situated halfway between the two ends of the surface. In practice, this rise is very small, e.g., within the range of 0.001-0.03 mm. This means that the camber of the part surface 13a is not visible to the naked eye. Within the scope of the invention, the design of the three carrying part surfaces may vary most considerably. For instance, all three part surfaces may have a cambered (or, alternatively, plane) shape.

Together, the part surfaces 13a, 13b and 13c form a three-point support for the cutting insert.

In FIG. 2, it is further seen that concavely arched limiting surfaces 18a, 18b are formed between on one hand the connecting surface 11 and on the other hand the surfaces 8, 9 that delimit the chip pocket 4. Adjacent to the upper portions of the surfaces 18a, 18b, guide surfaces 19, 20 are formed, which are obtusely angled in relation to the connecting surface 11. The purpose of the guide surfaces 19, 20 is to guide the cutting insert to a correct location in relation to the elevation 12, when the cutting insert is dropped down into the insert seat in order to subsequently be fixed by the tightening screw 3.

Also a clearance space 21 is formed in the inner corner between the two concave limiting surfaces 18a, 18b.

In the example shown, the connecting surface 11 is located at a positive axial tipping-in angle, and a negative radial tipping-in angle in the basic body.

Figure 3:
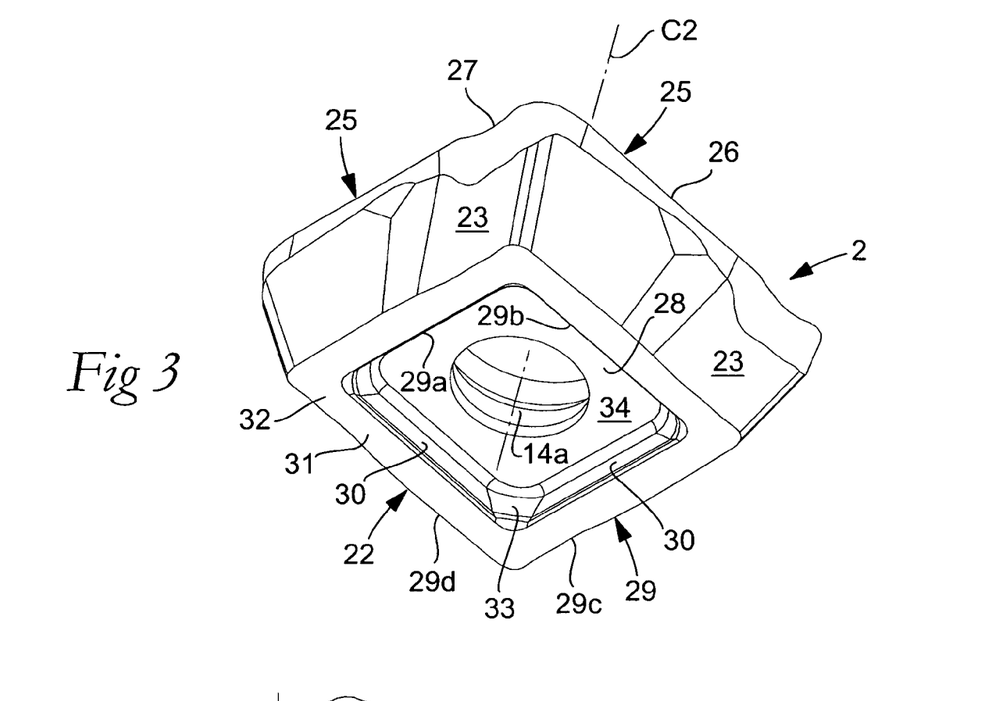
FIG. 3 is a bottom perspective view, showing a second connecting surface of the cutting insert.
Figure 4:
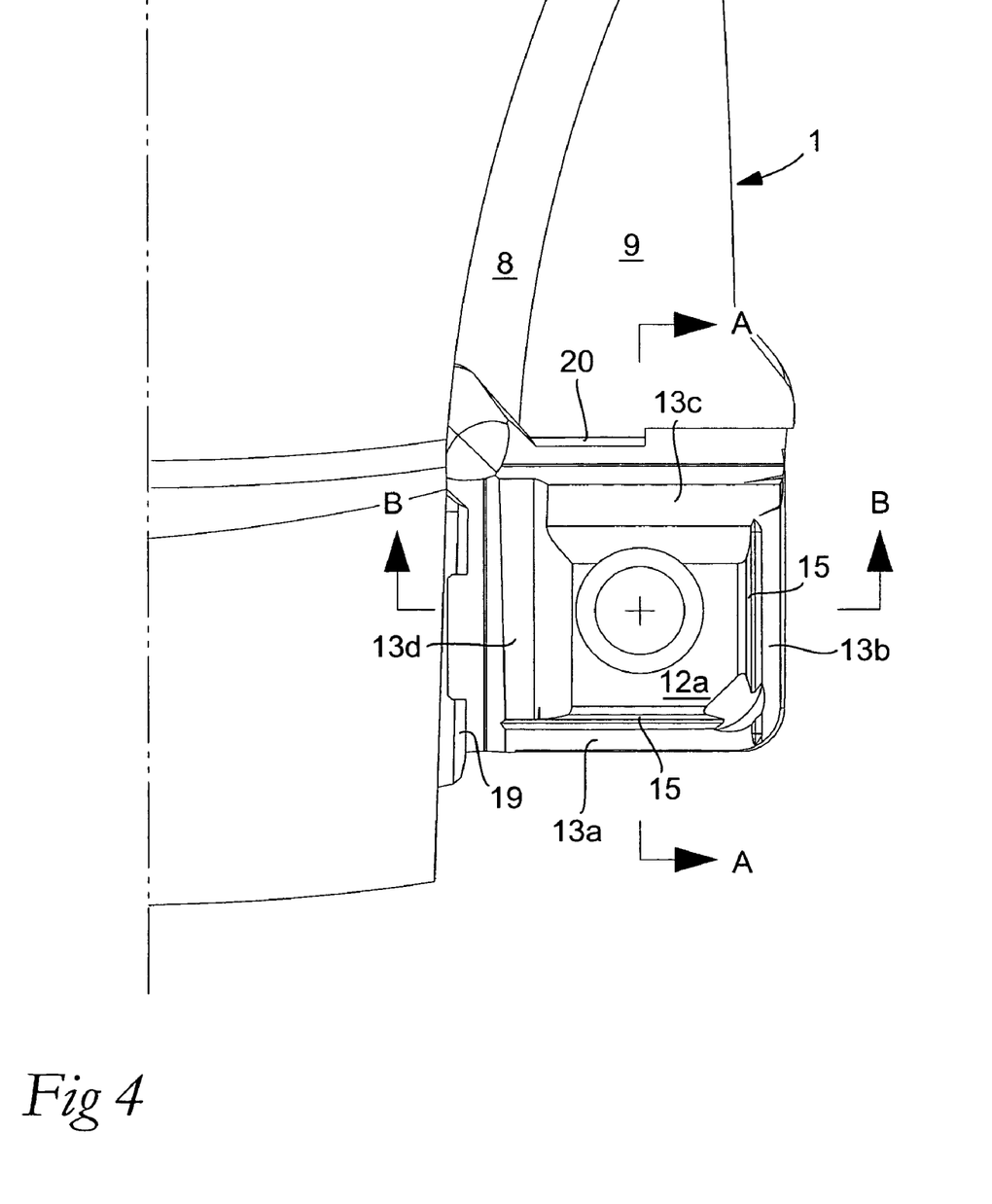
FIG. 4 is a planar view from above of the insert seat in the basic body.

As previously has been mentioned, the cutting insert 2 has a square basic shape and includes a second connecting surface 22 that forms the underside of thereof. Clearance surfaces 23 extend obtusely angled to the underside and transform into the upperside 24 of the cutting insert (see FIG. 1) via cutting edges 25, which in this case include a chip-removing main edge 26 as well as a surface-wiping wiper edge 27.

The connecting surface 22 includes a single or solitary depression 28, which is wider as well as deeper than the elevation 12 of the connecting surface 11 of the basic body. The depression 28 is surrounded by a tetragonal frame or embankment 29, which includes four individual, substantially straight banks 29a, 29b, 29c, 29d. Each such bank includes an internal shoulder surface 30, which is pressable against either side support surface 15*a*, 15*b* of the elevation 12, as well as a lower base surface 31. In the preferred embodiment, the four base surfaces 31 are plane and situated in a common plane. In the example, the four banks 29*a*, 29*b*, 29*c*, 29*d* converge pair-wise in four corner portions 32 in order to, together, form an endless frame. Hence, the plane undersides 31 of the banks together form an endless, plane surface.

The shoulder surfaces 30 of the insides of the banks are advantageously cross-sectionally convex. For instance, the convex shape may be defined by an involute curve. The four shoulder surfaces 30 are mutually spaced-apart by corner-wise situated clearance spaces 33. In the example, the innermost surface 34, which forms a "ceiling" in the depression 28, is plane and extends parallel to the lower frame surface 31 as well as perpendicularly to the center axis C2 of the cutting insert.

While the cutting insert 2 is manufactured from cemented carbide or another hard and wear-resistant material, not only the basic body 1 but also the tightening screw 3 is suitably manufactured from steel or the like. By using steel in the screw, the same obtains a certain inherent elasticity, which can be utilized to apply tightening forces to the cutting insert, axially as well as laterally.

Figure 5:
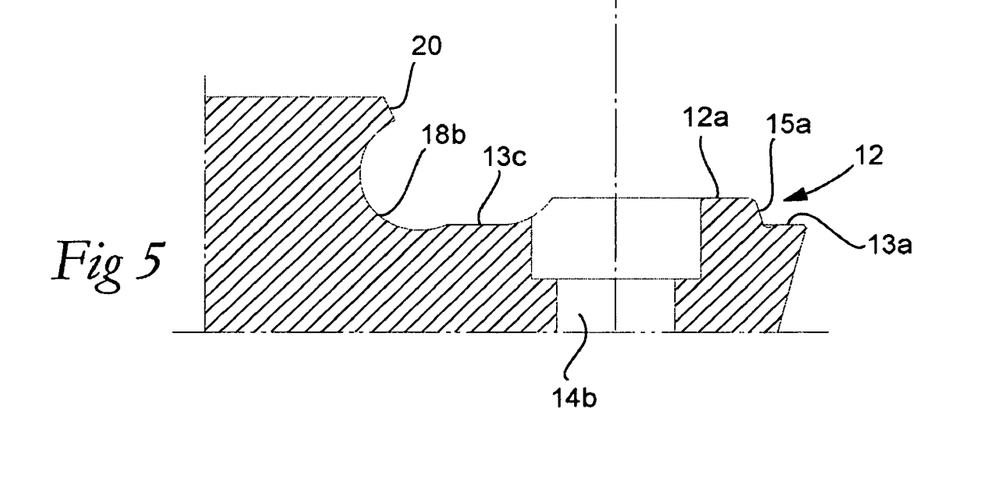
FIG. 5 is an exploded view, showing the cross-section shape of the cutting insert and insert seat in section A-A in FIG. 4.
Figure 6:
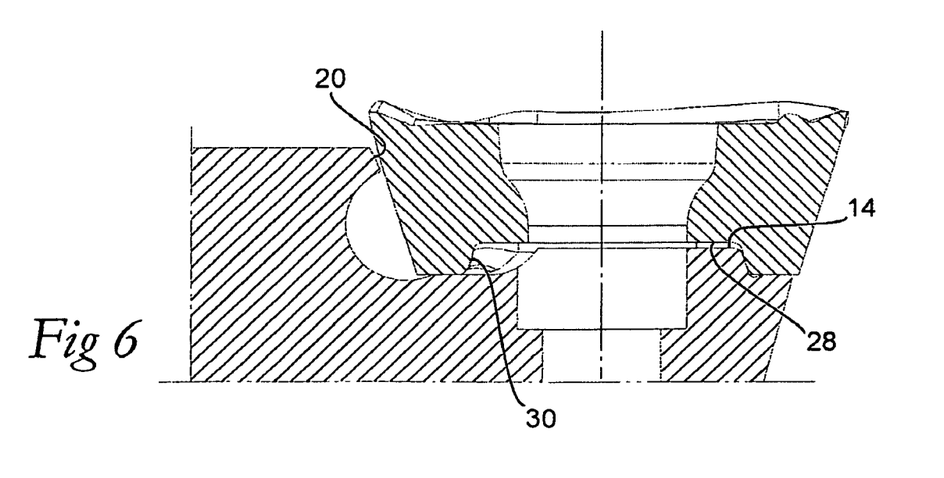
FIG. 6 is a section corresponding to FIG. 5, showing the cutting insert mounted in the insert seat.
Figure 7:
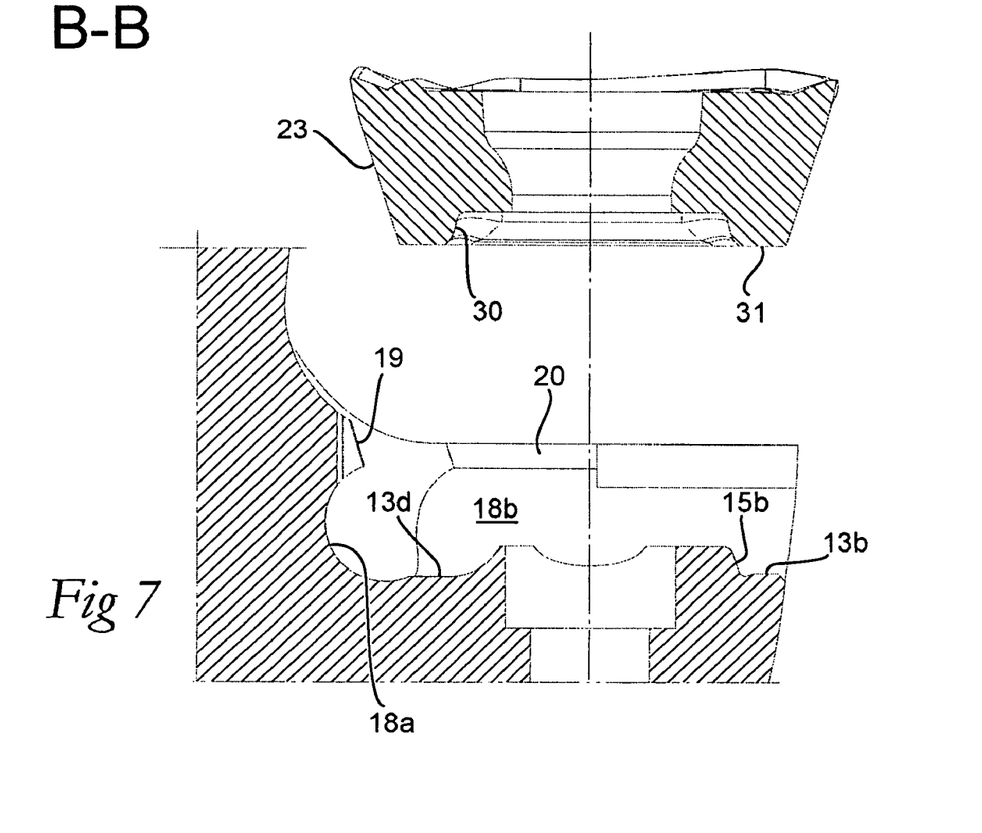
FIG. 7 is an exploded view through the cutting insert and basic body in section B-B in FIG. 4.
Figure 8:
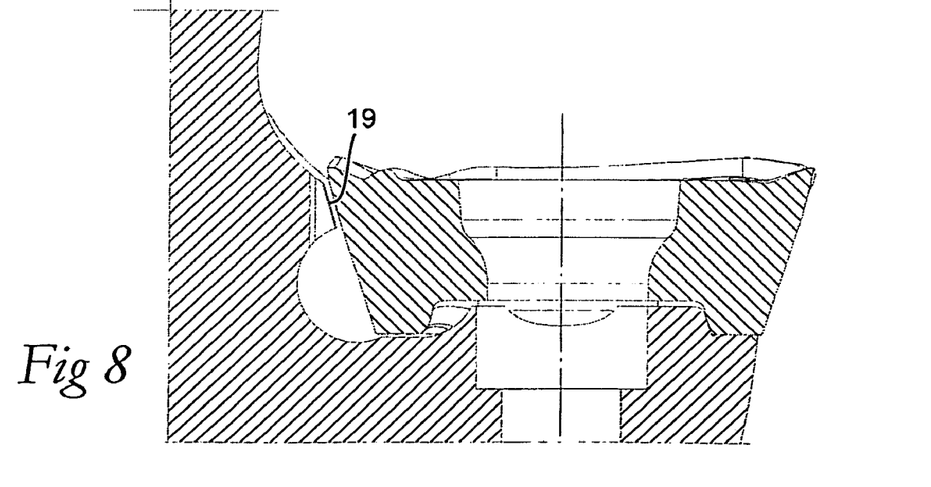
FIG. 8 is a section corresponding to FIG. 7, showing the cutting insert mounted in the insert seat.

Reference is now made to FIGS. 5-8, which in more detail illustrate the co-operation of the cutting insert with the basic body. In FIGS. 5 and 7, the cutting insert 2 is shown spaced-apart from the insert seat of the basic body, while FIGS. 6 and 8 show the cutting insert in a mounted state, however without the tightening screw for the fixation being shown. When the cutting insert is to be mounted, the operator holds the clearance sides 23 of the cutting insert in contact with the guide surfaces 19, 20, and then the cutting insert is dropped down into the insert seat. When this has taken place, the tightening screw 3 is applied and tightened into the appurtenant female thread. In this connection, two of the four shoulder surfaces 30 of the inside of the frame 29 are pressed against the two side support surfaces 15*a*, 15*b* that meet each other in the corner 16 of the elevation. Simultaneously, three of the four base surfaces 31 are pressed against three of the four part surfaces that together form a bottom in the insert seat, viz. the surfaces 13*a*, 13*b* and 13*c*. However, the fourth base surface 31 of the cutting insert clears the radially inner part surface 13*d* (see FIG. 8), because this is countersunk in relation to the other bottom part surfaces. The pressing of the frame of the cutting insert against the two side support surfaces 15*a*, 15*b* is effected by spring action in the tightening screw. More precisely, the elevation 12 is formed in such a way that the distance between the center axis C1 and the individual side support surface 15*a*, 15*b* is somewhat greater (the order of 0.01-0.2 mm) than the distance between the center axis C2 and the individual shoulder surface 30 that is pressed against the appurtenant side support surface 15*a*, 15*b*. Therefore, upon final tightening of the tightening screw, an axial tightening force, which presses the surfaces 31 against the part surfaces 13*a*, 13*b*, 13*c*, as well as co-operating lateral forces, which presses two shoulder surfaces 30 against the two side support surfaces 15*a*, 15*b* of the elevation 12, will be applied to the cutting insert. In other words, the elevation 12 is wedged in with the corner 16 thereof in the internal corner of the connecting surface of the cutting insert. As is clearly seen in FIGS. 5-8, the fact that the depression in the cutting insert is deeper than the elevation of the basic body means that the ceiling surface 34 in the depression 28 clears the top surface 12*a* of the elevation. By the depression furthermore being wider than the elevation, two of the four shoulder surfaces 30 of the depression will clear the two side surfaces of the elevation that are facing inward and do not form support for the cutting insert.

In the example shown, in which the elevation 12 of the basic body as well as the depression 28 in the cutting insert are square, the two side support surfaces 15*a*, 15*b* of the elevation may run at an angle of 90° to each other at the same time as also adjacent shoulder surfaces 30 in the depression of the cutting insert run at an angle of 90° to each other. However, within the scope of the invention, it is also possible to form the surface pairs with a certain, diminutive angle difference. For instance, the angle between the side support surfaces 15*a*, 15*b* of the elevation composed of steel could be some minute smaller than the angle between the shoulder surfaces 30 of the cemented carbide insert, surface contact being established by coining of the softer material of the steel elevation, more precisely, in the direction from the corner 16.

An advantage of the interface according to the invention is that the same guarantees a stable fixation of the cutting insert, and has capacity to carry not only large axial and radial forces but also considerable tangential forces. Because only a pair of surfaces running at an angle to each other of the two co-operating connecting surfaces carry the axial and radial cutting forces, respectively, the negative impact of possible form defects in the cutting insert is reduced to a minimum. Namely, if the cutting insert would swell or shrink in relation to the nominal size thereof, this will have little or negligible impact on the location of an important part of the cutting insert, viz. the corner between an active main edge and an active wiper edge.

The invention is not limited only to the embodiments described above and shown in the drawings. Thus, the invention is applicable to other cutting tools than milling cutters, e.g., drilling tools and turning tools as well as to other indexable cutting inserts than square cutting inserts having four cutting edges. Furthermore, the interface may be applied to all tools, the cutting inserts of which have polygonal basic shape and include two or more usable cutting edges. It is even possible to apply the invention to round cutting inserts having circular cutting edges, which are partially usable in two or more index positions. Furthermore, the cutting insert may be fixed by other tightening elements than screws, e.g., clamps, wedges or the like. In this connection, the connecting surface of the basic body may be formed in a shim plate, e.g., of cemented carbide, which in turn is detachably connected to the basic body as such. Furthermore, the frame that surrounds the depression in the underside of the cutting insert does not necessarily need to be continuous. Thus, the banks that together form the frame may be mutually spaced-apart by, more or less deep recesses situated in the corners.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
 a basic body having a connecting surface included in an insert seat; and
 an indexable cutting insert mounted in the basic body and having a connecting surface in mechanical engagement with the connecting surface of the basic body, and fixed by a tightening element, wherein the connecting surface of the basic body includes a solitary, polygonal elevation that protrudes from a bottom surrounding the elevation from all sides, the elevation including two external side support surfaces orientated at an angle to each other, wherein the connecting surface of the cutting insert includes a solitary depression that is wider and deeper than the elevation, the depression being surrounded by a frame including at least three banks running at an angle to each other, the at least three banks including internal shoulder surfaces, two of which are pressed against the two side support surfaces of the elevation, and the at least three banks including lower base surfaces situated in a common plane, three of which rest against the bottom surrounding the elevation, and wherein the bottom surrounding the elevation includes the same number of elongate part surfaces as the number of corners of the elevation, three part surfaces of which serve as bottom support surfaces respectively having points in a common plane to afford a three-point support to the cutting insert.

2. The tool according to claim 1, wherein at least two of the three bottom support surfaces are plane.

3. The tool according to claim 1, wherein one of the three bottom support surfaces is cambered by having a highest point situated between the two opposite ends of the surface.

4. A tool for chip removing machining, comprising:
a basic body having a connecting surface included in an insert seat; and
an indexable cutting insert mounted in the basic body and having a connecting surface in mechanical engagement with the connecting surface of the basic body, and fixed by a tightening element,
wherein the connecting surface of the basic body includes a solitary, polygonal elevation that protrudes from a bottom surrounding the elevation from all sides, the elevation including two external side support surfaces orientated at an angle to each other,
wherein the connecting surface of the cutting insert includes a solitary depression that is wider and deeper than the elevation, the depression being surrounded by a frame including at least three banks running at an angle to each other, the at least three banks including internal shoulder surfaces, two of which are pressed against the two side support surfaces of the elevation, and the at least three banks including lower base surfaces situated in a common plane, three of which rest against the bottom surrounding the elevation, and
wherein one or more guide surfaces are formed in the basic body and inclined relative to the elevation and spaced apart from the cutting insert, the guide surfaces guide the depression in the underside of the cutting insert toward the elevation in connection with mounting the cutting insert.

5. A tool for chip removing machining, comprising:
a basic body having a connecting surface included in an insert seat; and
an indexable cutting insert mounted in the basic body and having a connecting surface in mechanical engagement with the connecting surface of the basic body, and fixed by a tightening element,
wherein the connecting surface of the basic body includes a solitary, polygonal elevation that protrudes from a bottom surrounding the elevation from all sides, the elevation including two external side support surfaces orientated at an angle to each other,
wherein the connecting surface of the cutting insert includes a solitary depression that is wider and deeper than the elevation, the depression being surrounded by a frame including at least three banks running at an angle to each other, the at least three banks including internal shoulder surfaces, two of which are pressed against the two side support surfaces of the elevation, and the at least three banks including lower base surfaces situated in a common plane, three of which rest against the bottom surrounding the elevation, and
wherein the tool is in the form of a milling cutter, the basic body of which is rotatable around a center axis and includes a chip pocket, which opens in an envelope surface as well as an end surface of the basic body, the insert seat having the connecting surface being formed in the chip pocket, wherein the elevation includes a corner between the two side support surfaces, the corner located in the vicinity of a corner between the envelope surface and the end surface of the basic body.

6. The tool according to claim 5, wherein the cutting insert is tetragonal and has a square basic shape, the depression being square, and the two side support surfaces of the elevation running perpendicularly to each other and being orientated essentially parallel to the end surface of the basic body, and the envelope surface, respectively.

7. The tool according to claim 1, wherein one of the elongate part surfaces surrounding the elevation is countersunk in relation to the three part surfaces to clear the cutting insert.

8. A basic body for a tool for chip removing machining, comprising:
a connecting surface for the co-operation with connecting surfaces in indexable cutting inserts, wherein the connecting surface of the basic body includes a solitary elevation that protrudes from a bottom surrounding the elevation from all sides, the elevation having two external side support surfaces orientated at an angle to each other, and
wherein the bottom surrounding the elevation includes the same number of elongate part surfaces as the number of corners of the elevation, three part surfaces of which serve as bottom support surfaces respectively having points in a common plane to afford a three-point support to the cutting insert.

9. The basic body according to claim 8, wherein, at least two of the three bottom support surfaces are plane.

10. The basic body according to claim 8, wherein one of the three bottom support surfaces is cambered by having a highest point situated between the two opposite ends of the surface.

11. A basic body for a tool for chip removing machining, comprising:
a connecting surface for the co-operation with connecting surfaces in indexable cutting inserts, wherein the connecting surface of the basic body includes a solitary elevation that protrudes from a bottom surrounding the elevation from all sides, the elevation having two external side support surfaces orientated at an angle to each other, and
wherein one or more guide surfaces are formed in the basic body and inclined relative to the elevation and to guide a depression in a cutting insert against the elevation in connection with mounting the cutting insert.

* * * * *